(12) United States Patent
Taga

(10) Patent No.: US 9,368,765 B2
(45) Date of Patent: Jun. 14, 2016

(54) BATTERY PACK

(75) Inventor: Hideyuki Taga, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 426 days.

(21) Appl. No.: 13/884,382

(22) PCT Filed: Oct. 17, 2011

(86) PCT No.: PCT/JP2011/073832
§ 371 (c)(1),
(2), (4) Date: May 31, 2013

(87) PCT Pub. No.: WO2012/063605
PCT Pub. Date: May 18, 2012

(65) Prior Publication Data
US 2013/0280573 A1 Oct. 24, 2013

(30) Foreign Application Priority Data
Nov. 12, 2010 (JP) ................................. 2010-253908

(51) Int. Cl.
*H01M 2/10* (2006.01)
*H01R 13/52* (2006.01)

(52) U.S. Cl.
CPC ............ *H01M 2/1022* (2013.01); *H01M 2/105* (2013.01); *H01M 2/1094* (2013.01);
(Continued)

(58) Field of Classification Search
CPC .. H01M 2/1022; H01M 2/105; H01R 13/521; H01R 13/5213; H01R 13/5216
See application file for complete search history.

(56) References Cited

U.S. PATENT DOCUMENTS 4,867,694 A * 9/1989 Short ................. H01R 13/4534
439/137
6,325,633 B1 12/2001 Ito et al.
(Continued)

FOREIGN PATENT DOCUMENTS

| JP | A-2000-188091 | 7/2000 |
| JP | A-2003-142051 | 5/2003 |

(Continued)

OTHER PUBLICATIONS

Japanese Office Action issued in Japanese Application No. 2010-253908 mailed Jun. 24, 2014 (with translation).
(Continued)

*Primary Examiner* — Scott J Chmielecki
(74) *Attorney, Agent, or Firm* — Oliff PLC

(57) ABSTRACT

Rubber cover main bodies close opening shapes of terminal-connection openings when a battery pack is placed alone without being mounted on a tool body. When the battery pack is removed from the tool body and is placed alone, it is possible to regulate the entry of foreign materials, such as water or dust, by the rubber cover main bodies. Further, when body-side connection terminals are connected to battery-side connection terminals, the rubber cover main bodies themselves can be deformed due to elasticity according to the slide movement of the body-side connection terminals such that the body-side connection terminals can be inserted into the rubber cover main bodies. Accordingly, it is possible to protect the battery-side connection terminals in the terminal-connection openings such that the battery-side connection terminals are not damaged by regulating the entry of foreign materials from the terminal-connection openings without hindering electrical connection caused by slide mounting.

6 Claims, 10 Drawing Sheets

(52) U.S. Cl.
CPC .......... *H01R13/521* (2013.01); *H01R 13/5213* (2013.01); *H01R 13/5216* (2013.01); *H01R 13/5219* (2013.01)

(56) References Cited

U.S. PATENT DOCUMENTS

| | | | |
|---|---|---|---|
| 6,346,793 | B1 | 2/2002 | Shibata et al. |
| 2002/0173189 | A1* | 11/2002 | Koyasu ................. H01R 13/08 439/188 |
| 2003/0082439 | A1 | 5/2003 | Sakakibara |
| 2003/0096160 | A1 | 5/2003 | Sugiura et al. |
| 2005/0026488 | A1* | 2/2005 | Janssen ............. H01R 13/5208 439/275 |
| 2005/0191899 | A1* | 9/2005 | Solano ................. H01R 13/521 439/519 |
| 2005/0221672 | A1* | 10/2005 | Tsuchjya ........... H01R 13/4223 439/587 |
| 2005/0225039 | A1* | 10/2005 | Seki ....................... F16J 15/061 277/637 |
| 2008/0302551 | A1 | 12/2008 | Komuro et al. |
| 2010/0156350 | A1 | 6/2010 | Murayama et al. |
| 2011/0012560 | A1* | 1/2011 | Sakakibara ................... 320/118 |

FOREIGN PATENT DOCUMENTS

| | | |
|---|---|---|
| JP | A-2008-302434 | 12/2008 |
| JP | A-2009-296724 | 12/2009 |
| JP | A-2010-146879 | 7/2010 |
| JP | A-2011-155821 | 8/2011 |
| JP | A-2012-54086 | 3/2012 |
| WO | 2009/118963 A1 | 10/2009 |

OTHER PUBLICATIONS

Dec. 27, 2011 International Search Report issued in International Application No. PCT/JP2011/073832 (with translation).
Nov. 17, 2015 Search Report issued in European Patent Application No. 11840270.0.

* cited by examiner

BATTERY PACK

BACKGROUND OF THE INVENTION

1. Field of the Invention

The present invention relates to a battery pack that is configured to be capable of sliding to be mounted on a tool body of an electric power tool as a power source of the electric power tool.

2. Description of the Related Art

In the related art, an electric power tool includes a tool body that is driven using electric power and a battery pack that serves as a drive power source of the tool body. The battery pack is configured to be detachably mounted on the tool body (for example, refer Japanese Laid-Open Patent Publication No. 2010-146879). For this reason, when the charge amount of the battery pack is reduced, the battery pack is removed from the tool body and can be charged by a special external charger. Further, when the battery pack is completely charged by the special charger, the battery pack is mounted on the tool body and serves as a drive power source of the electric power tool.

Meanwhile, the battery pack is configured to be capable of sliding to be mounted on a mounting target such as the tool body. For this purpose, the battery pack is provided with female connection terminals that are connected to male connection terminals provided on the mounted tool when the battery pack slides to be mounted.

Specifically, the above-mentioned male connection terminals of the mounting target are formed in the shape of plate that extends in a slide direction when the battery pack is mounted. In contrast, the female connection terminals of the battery pack has a shape extending in a slide mounting direction so as to be connected to the male connection terminals according to the slide mounting of the battery pack on the mounting target. For this reason, a housing case that forms an exterior of the battery pack is provided with terminal-connection openings having an opening shape corresponding to the shape of the female connection terminal that is to be connected to the male connection terminal according to the slide mounting of the battery pack on the mounting target.

Incidentally, the above-mentioned battery pack is removed from the mounting target such as the tool body and may be placed alone. In this case, the terminal-connection openings of the housing case are exposed to the outside. Accordingly, foreign materials, such as water or dust, may be introduced into the housing case through the terminal-connection openings. When the foreign materials are introduced into the housing case through the terminal-connection openings, the female connection terminals may be damaged by the introduced foreign materials.

There is a need in the art to provide a battery pack that is configured to be capable of sliding to be mounted on a tool body (a mounting target) of an electric power tool as a power source of the electric power tool, that does not hinder electrical connection between connection terminals and connection terminals of the tool body that is caused by slide mounting, and that protects the connection terminals in the connection openings so that the connection terminals are not damaged, by regulating the entry of foreign materials, such as water or dust, from the terminal-connection openings when the battery pack is removed from the tool body and is placed alone.

SUMMARY OF THE INVENTION

That is, according to a first aspect of the invention, there is provided a battery pack that is configured to be capable of slidably moving on a tool body of an electric power tool served as a power source of the electric power tool and that includes battery-side connection terminals to which body-side connection terminals of the tool body are connected by a relative slide movement when the battery pack slides to be mounted. A housing case that forms an exterior of the battery pack is provided with terminal-connection openings that extend in a slide direction of slide mounting while making the inside and outside of the housing case communicate with each other, such that the body-side connection terminals can be connected to the battery-side connection terminals. The terminal-connection openings are provided with foreign-material entry-regulating members that can close opening shapes of the terminal-connection openings when the battery pack is placed alone without being mounted on the tool body. The foreign-material entry-regulating members serve not to interfere with the connection when the body-side connection terminals are connected to the battery-side connection terminals.

According to the battery pack of the first aspect, the foreign-material entry-regulating members close the opening shapes of the terminal-connection openings when the battery pack is placed alone without being mounted on the tool body. Accordingly, when the battery pack is removed from the tool body (a mounting target) and is placed alone, it is possible to regulate the entry of foreign materials, such as water or dust, from the terminal-connection openings by the foreign-material entry-regulating members. Therefore, it is possible to protect the battery-side connection terminals in the terminal-connection openings so that the battery-side connection terminals are not damaged. Further, the foreign-material entry-regulating members can work not to interfere with the connection when the body-side connection terminals are connected to the battery-side connection terminals. Therefore, according to the battery pack of the first aspect, the electrical connection between the body-side connection terminals and the battery-side connection terminals which is caused by slide mounting is not hindered, and it is possible to protect the battery-side connection terminals in the terminal-connection openings so that the battery-side connection terminals are not damaged even though the battery pack is removed from the tool body and is placed alone.

According to a second aspect, in the battery pack according to the first aspect, the foreign-material entry-regulating members have elasticity and are formed in a shape that can close the opening shapes of the terminal-connection openings. When the body-side connection terminals are connected to the battery-side connection terminals, the foreign-material entry-regulating members themselves are deformed due to elasticity according to the slide movement of the body-side connection terminals that come into contact with the foreign-material entry-regulating members and slidably move such that the body-side connection terminals can be inserted into the foreign-material entry-regulating members. When the battery pack is placed alone without being mounted on the tool body, the foreign-material entry-regulating members themselves are restored due to elasticity so as to close the opening shapes of the terminal-connection openings.

The foreign-material entry-regulating members of the battery pack according to the second aspect have elasticity and are formed in a shape that closes the opening shapes. Accordingly, when the body-side connection terminals are connected to the battery-side connection terminals, the foreign-material entry-regulating members themselves are deformed due to elasticity according to the slide movement of the body-side connection terminals and the body-side connection terminals can be inserted into the foreign-material entry-regulating members. Moreover, when the battery pack is placed alone without being mounted on the tool body, the foreign-material entry-regulating members themselves are restored due to elasticity and can close the opening shapes of the terminal-connection openings. According to the battery pack of the second aspect, since it is possible to make the battery pack simple in addition to the functional effects of the above-mentioned battery pack according to the first aspect, it is possible to reduce the manufacturing cost of the battery pack and to also simplify the assembly work.

According to a third aspect, in the battery pack according to the first aspect, the foreign-material entry-regulating members include door portions that can open and close the opening shapes of the terminal-connection openings, and also include biasing portions that can close the opening shapes of the terminal-connection openings with the door portions by biasing the door portions in a closing direction. When the body-side connection terminals are connected to the battery-side connection terminals, the door portions are opened against biasing forces of the biasing portions according to the slide movement of the body-side connection terminals that come into contact with the door portions of the foreign-material entry-regulating members and slidably move such that the body-side connection terminals can be inserted into the foreign-material entry-regulating members. When the battery pack is placed alone without being mounted on the tool body, the door portions are closed by the biasing forces of the biasing portions of the foreign-material entry-regulating members so as to close the opening shapes of the terminal-connection openings.

The foreign-material entry-regulating members of the battery pack according to the third aspect include the door portions that can open and close the opening shapes, and also include the biasing portions that close the opening shapes with the door portions by biasing the door portions in the closing direction. Accordingly, when the body-side connection terminals are connected to the battery-side connection terminals, it is possible to open the door portions by elastically deforming the biasing portions according to the slide movement of the body-side connection terminals and to insert the body-side connection terminals into the foreign-material entry-regulating members. Further, when the battery pack is placed alone without being mounted on the tool body, it is possible to close the opening shapes of the terminal-connection openings by closing the door portions with the biasing forces of the biasing portions of the foreign-material entry-regulating members. Accordingly, since the functions are separately obtained, it is possible to more reliably obtain functional effects in addition to the functional effects of the above-mentioned battery pack according to the first aspect.

According to a fourth aspect, in the battery pack according to any one of the first to third aspects, guide portions are provided at portions of the foreign-material entry-regulating members with which the body-side connection terminals come into contact by the slide movement of the body-side connection terminals when the tool body slides to be mounted. The guide portions are configured to guide the body-side connection terminals such that the body-side connection terminals can be inserted into the foreign-material entry-regulating members.

Meanwhile, various shapes, such as a chamfered shape, a tapered shape and an inclined shape, can be selected as the shape of the "guide portion, which guides the body-side connection terminal so that the body-side connection terminal is inserted into the foreign-material entry-regulating member".

According to the battery pack of the fourth aspect, since the guide portions are provided at the portions of the foreign-material entry-regulating members with which the body-side connection terminals come into contact, the body-side connection terminals can be guided so as to be capable of being inserted into the foreign-material entry-regulating members. Accordingly, it is possible to smoothly insert the body-side connection terminals into the foreign-material entry-regulating members by the slide movement of the body-side connection terminals when the tool body slides to be mounted.

According to a fifth aspect, in the battery pack according to any one of the first to fourth aspects, the foreign-material entry-regulating members are formed to have heat resistance.

According to the battery pack of the fifth aspect, since the foreign-material entry-regulating members are formed to have heat resistance, it is possible to reduce the deterioration of the foreign-material entry-regulating members which is caused by heat even though the battery pack is heated when being used or charged. Therefore, it is also possible to contribute to the extension of the lifetime of a product as a battery pack by reducing the deterioration of the foreign-material entry-regulating members.

Effect of the Invention

According to the battery pack of the first aspect, the electrical connection between the body-side connection terminals and the battery-side connection terminals that is caused by slide mounting is not hindered, and also it is possible to protect the battery-side connection terminals in the terminal-connection openings so that the battery-side connection terminals are not damaged even though the battery pack is removed from the tool body and is placed alone.

According to the battery pack of the second aspect, since it is possible to make the battery pack simple, it is possible to reduce the manufacturing cost of the battery pack and to also simplify the assembly work.

According to the battery pack of the third aspect, since the functions are separately obtained, it is possible to more reliably obtain functional effects.

According to the battery pack of the fourth aspect, it is possible to smoothly insert the body-side connection terminals into the foreign-material entry-regulating members by the slide movement of the body-side connection terminals when the tool body slides to be mounted.

According to the battery pack of the fifth aspect, it is also possible to contribute to the extension of the lifetime of a product as a battery pack by reducing the deterioration of the foreign-material entry-regulating members.

DESCRIPTION OF PREFERRED EMBODIMENTS

First Embodiment

A first embodiment, which embodies a battery pack according to the invention, will be described below with reference to FIG. 1 to FIG. 7. Meanwhile, the electrical connection side of a battery pack 10 to be shown is defined as the upper side of the battery pack 10 and the slide mounting direction thereof is defined as the forward direction of the battery pack 10.

Figure 1:
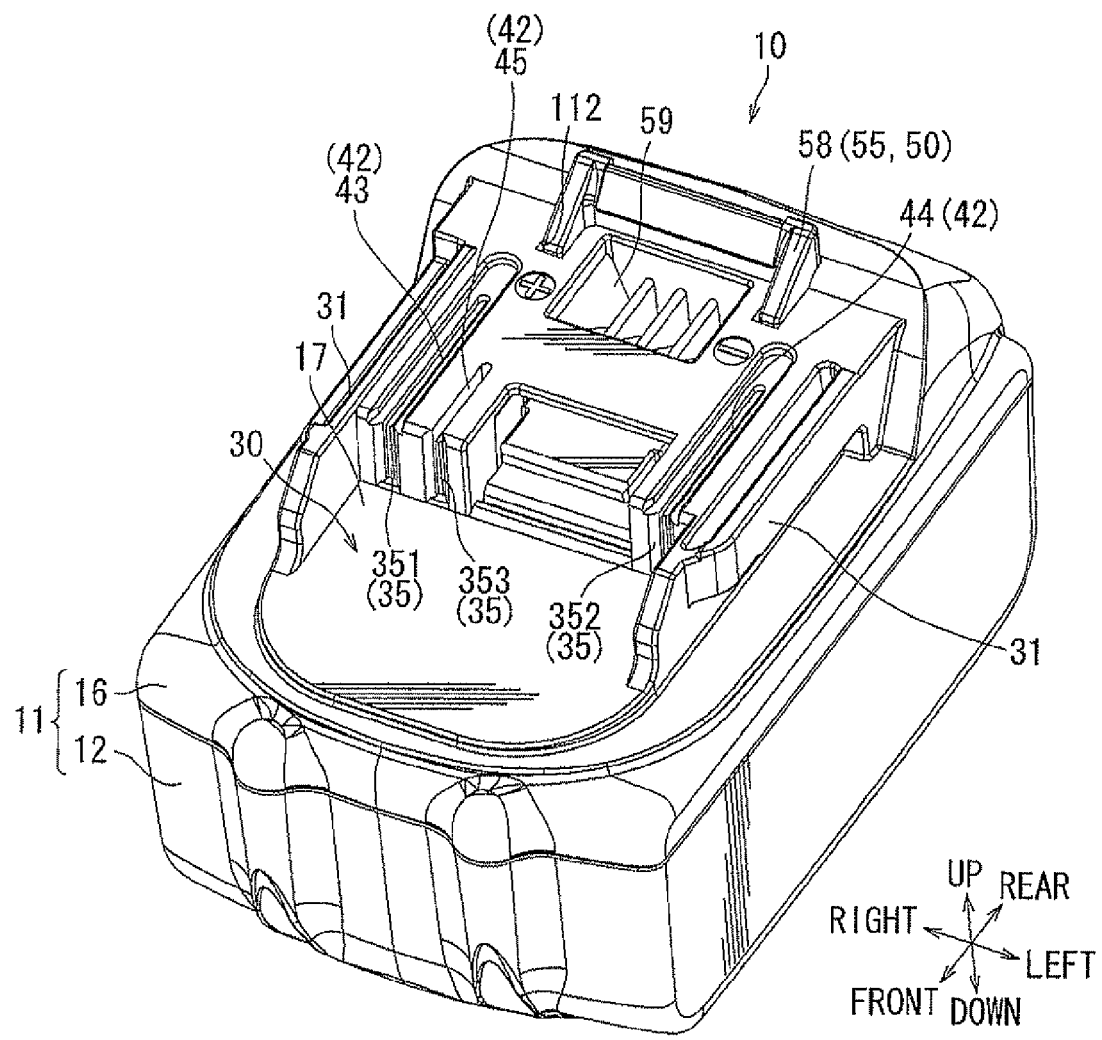
FIG. 1 is an external perspective view showing a battery pack of a first embodiment.

FIG. 1 shows the external perspective view of the battery pack 10, which is a first embodiment. As a drive power source of an electric power tool (not shown) that is exemplified by, for example, an electric screwdriver, the battery pack 10 shown in FIG. 1 is detachably mounted on a tool body of the electric power tool. When the charge amount of the battery pack 10 is reduced, the battery pack 10 is removed from the tool body and charged by a special external charger. Accordingly, when the electric power tool is used, the battery pack 10 is mounted on the tool body as a drive power source of the electric power tool. Here, the battery pack 10 has a slide mounting structure by which the battery pack 10 can be slidably mounted on a tool body or a special charger serving as a mounting target.

Figure 2:
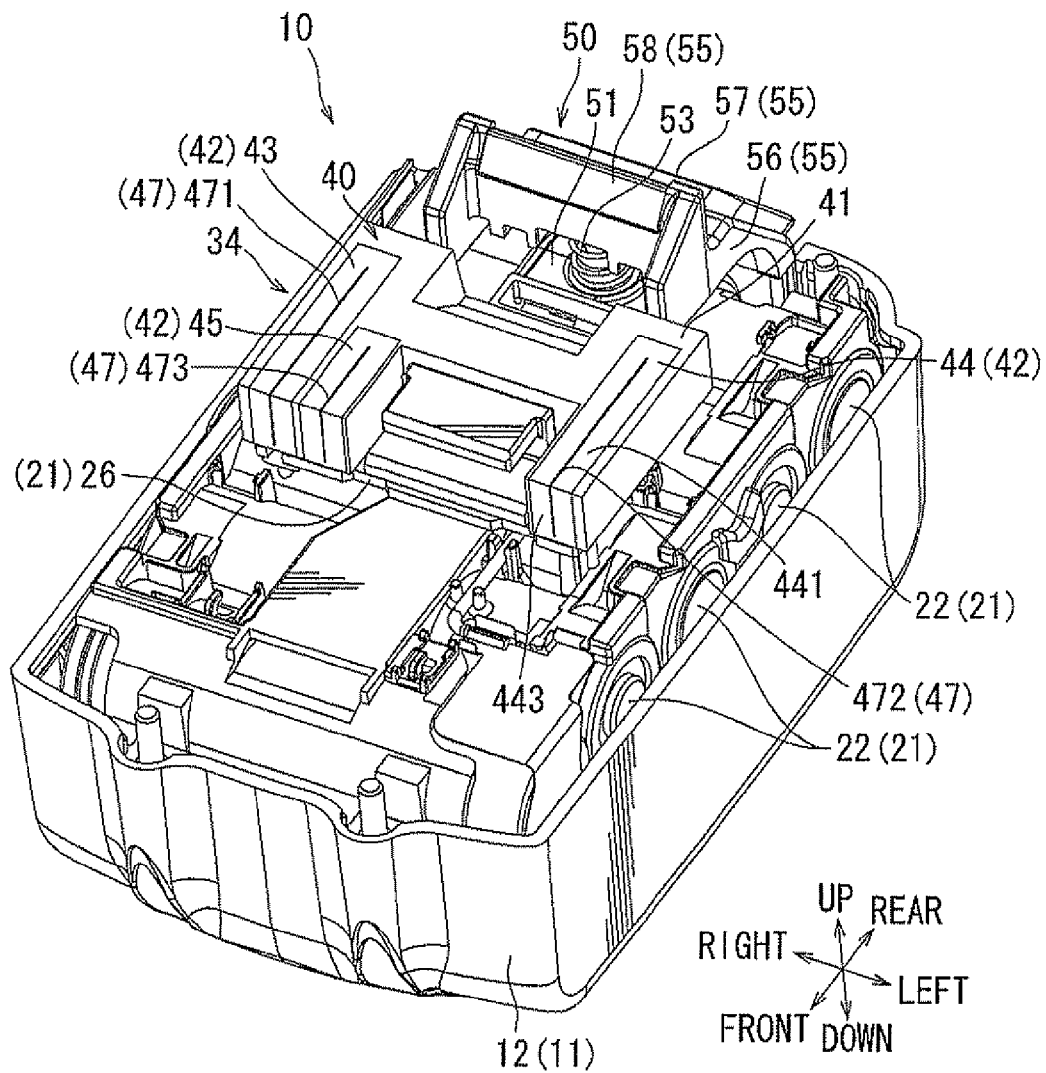
FIG. 2 is a first inside perspective view showing the inside of the battery pack of FIG. 1.
Figure 3:
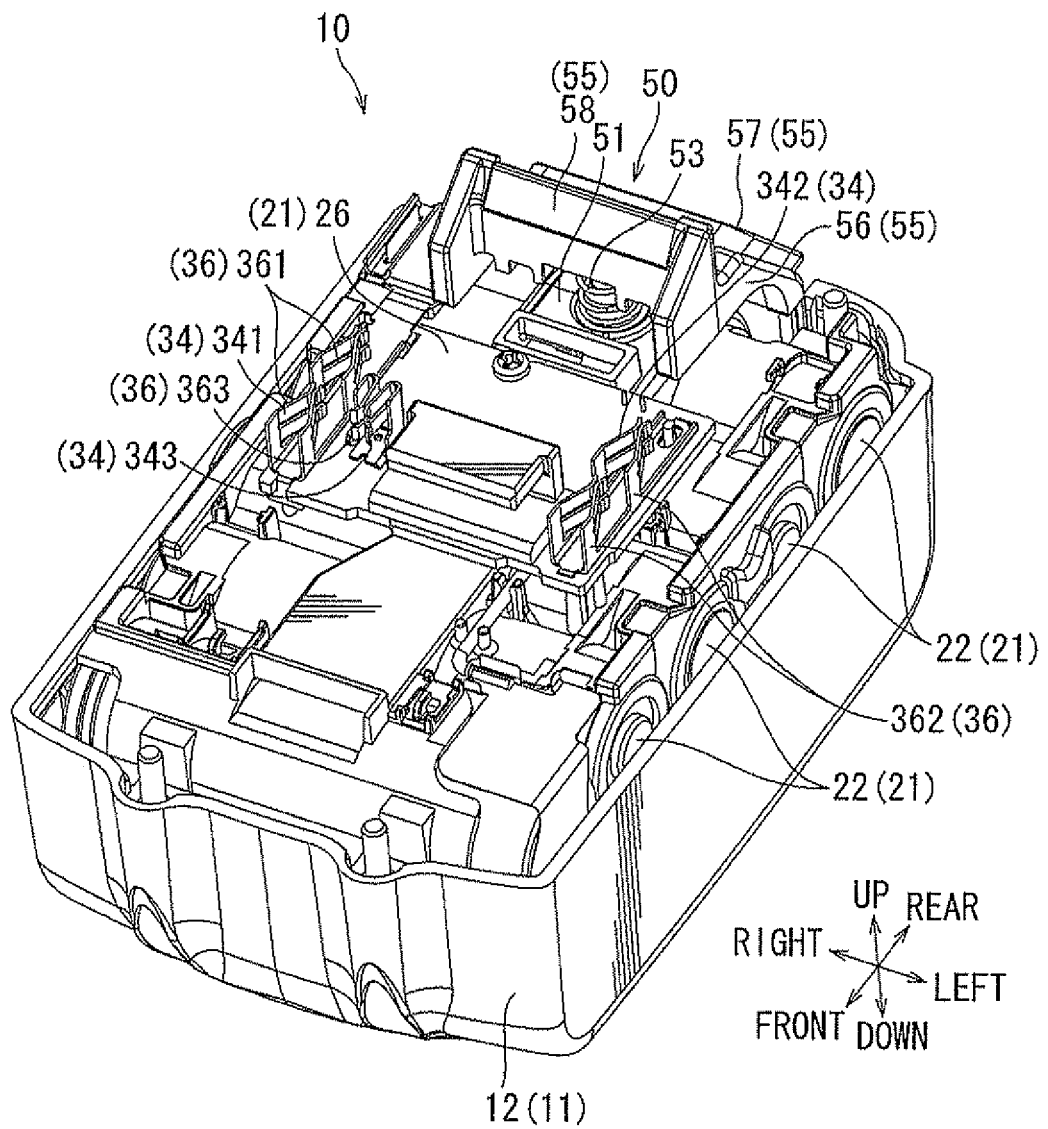
FIG. 3 is a second inside perspective view showing the inside of the battery pack of FIG. 1.

FIG. 2 is a first inside perspective view showing the inside of the battery pack 10 from which an upper cover member 16 is removed. FIG. 3 is a second inside perspective view showing the inside of the battery pack 10 from which the upper cover member 16 and a rubber cover body 40 are removed.

As shown in FIG. 2 and FIG. 3, the battery pack 10 generally includes a housing case 11 and an internal installation body 21. The housing case 11 serves as an exterior case of the battery pack 10 and as a housing in which the internal installation body 21 is housed. The housing case 11 includes a box-shaped case main body 12 of which an upper portion is opened, and an upper cover member 16 that closes the opened upper portion of the case main body 12 so as to serve as an upper cover of the case main body 12. The case main body 12 is configured so that the internal installation body 21 can be disposed in the box-shaped inner portion of the case main body. The upper cover member 16 is mounted so as to close the opened upper portion of the case main body 12 where the internal installation body 21 is disposed in the box-shaped inner portion, and is fastened by fastening screws (not shown). Accordingly, the housing case 11 having a housing structure by which the internal installation body 21 is housed is formed. Meanwhile, an opening shape, which communicates with the inside of the housing case 11 from the outside of the housing case 11 as shown in FIG. 1 when electrical connection portions 34 is disposed, is formed at the housing case 11. The internal installation body 21 has a power source of the battery pack 10. As shown in FIG. 3, the internal installation body 21 includes a plurality of battery cells 22 and a control board 26 that is electrically connected to the plurality of battery cells 22. The battery cells 22 can be charged, and the battery pack 10 serves as a drive power source of the electric power tool. The plurality of battery cells 22 are housed in the housing case 11 as shown in FIG. 2 and FIG. 3, and are electrically connected to the control board 26. The control board 26 appropriately controls such that the battery cells 22 are charged or discharged. Meanwhile, the control board 26 is electrically connected to positive connection terminals 361 of a positive connection portion 341, negative connection terminals 362 of a negative connection portion 342, and control connection terminals 363 of a control connection portion 343 that will be described below.

Incidentally, a slide mounting portion 30, on which a tool body (not shown) or a special charger (not shown) as a mounting target can be slidably mounted, is provided on an upper surface 17 of the above-mentioned housing case 11 as shown in FIG. 1. The slide mounting portion 30 serves to allow the battery pack 10 to be slidably mounted. That is, the slide mounting portion 30 is configured so as to be capable of being electrically connected to the tool body while guiding the slide mounting of the battery pack 10. Specifically, as shown in FIG. 1, the slide mounting portion 30 includes slide guide portions 31 that guide the slide mounting of the battery pack 10, and also include the electrical connection portions 34 that electrically connect the battery pack 10.

The slide guide portions 31 are formed in a male guide shape, which extends in a front and rear direction while protruding appropriately in an outer flange shape, so as to make a pair in the left-and-right width direction on the upper surface 17 of the battery pack 10. The slide guide portions 31 can be fitted into a female guide shape, which is formed on the tool body in a slide direction. Meanwhile, as shown in FIG. 1, a direction in which the battery pack 10 to be slidably mounted is the forward direction of the battery pack 10 and a direction in which the battery pack 10 is removed is the rearward direction of the battery pack 10.

Figure 4:
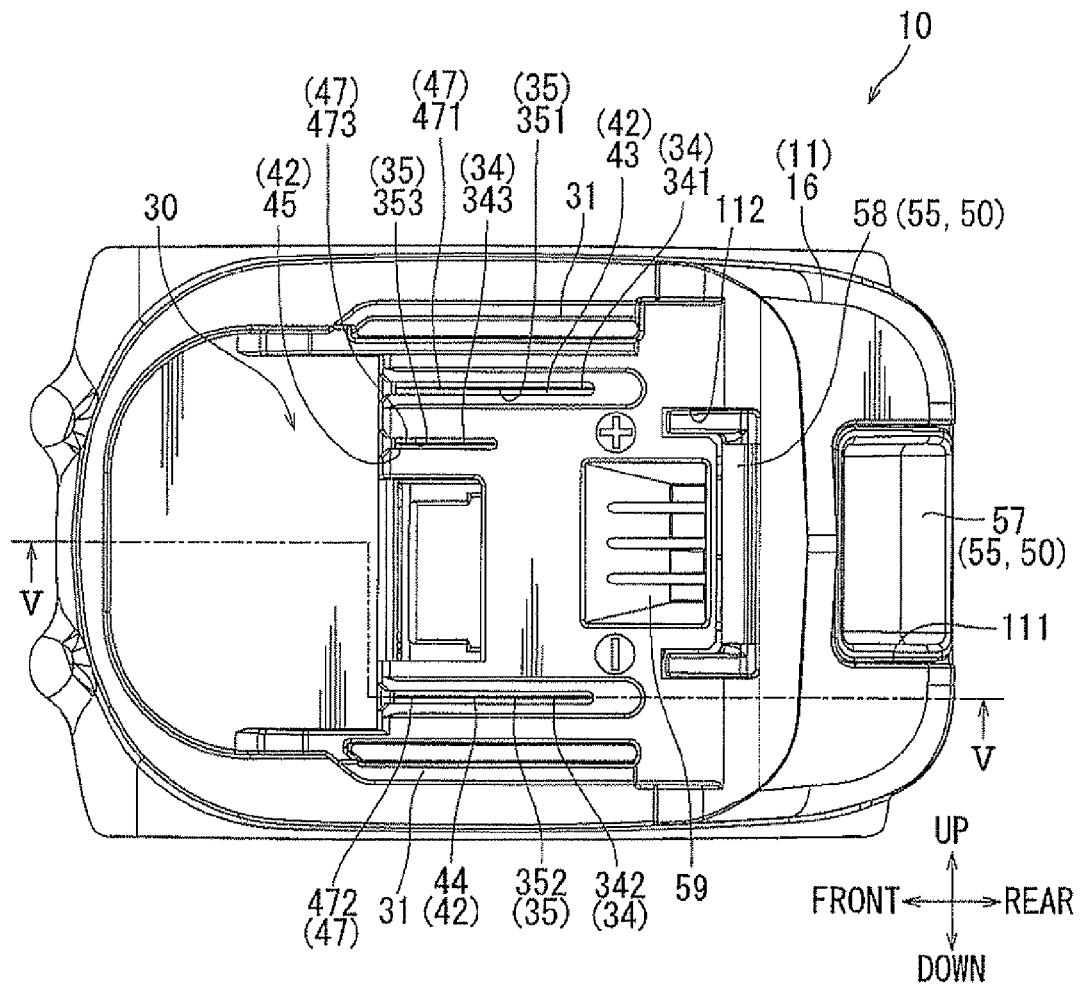
FIG. 4 is a top view showing the inside of the battery pack of FIG. 1.

Incidentally, the battery pack 10 is provided with a male hook mechanism 50 that is fitted into a female hook portion (not shown) formed on the tool body when the battery pack is mounted on the above-mentioned tool body (a mounting target). The male hook mechanism 50 is disposed so as to be received in a receiving space that is formed between the housing case 11 and the internal installation body 21. As shown in FIG. 2 to FIG. 4, the male hook mechanism 50 generally includes a base member 51, a biasing coil spring 53, and a male hook body 55. The base member 51 has a structure by which the housing case 11 can be removed from the internal installation body 21, and also the base member 51 is fixed to the housing case 11. The lower end of the biasing coil spring 53 comes into contact with the upper surface of the base member 51, and the upper end of the biasing coil spring 53 comes into contact with the lower surface of the male hook body 55. Accordingly, the biasing coil spring 53 biases the male hook body 55 upward. The male hook body 55 is biased upward by the biasing coil spring 53, and is configured to be capable of moving up and down relative to the base member 51 and the housing case 11.

The male hook body 55 generally includes a connecting portion 56, an operation portion 57, and a hook portion 58. Meanwhile, the operation portion 57 and the hook portion 58 of the male hook body 55 are exposed to the outside, and the connecting portion 56 extends so as to connect the operation portion 57 to the hook portion 58. The connecting portion 56 receives a biasing force of the above-mentioned biasing coil spring 53. The operation portion 57 is positioned at the rear portion of the male hook body 55, and is formed in a concave shape where an operation finger can be caught. As shown in FIG. 4, the operation portion 57 is exposed to the outside through an operation exposure window 111 that is formed at the rear portion of the housing case 11. Further, the hook portion 58, which is integrated with the operation portion 57 through the connecting portion 56, is exposed to the outside through a hook exposure window 112 that is formed at the upper portion of the housing case 11. The hook portion 58 is formed in an appropriate male hook shape that is fitted into a female hook portion (not shown) of the tool body (a mounting target). That is, the male hook mechanism 50 in a normal state makes the hook portion 58 of the male hook body 55 protrude from the hook exposure window 112 by the biasing force of the biasing coil spring 53, so that the hook portion can be fitted into the female hook portion (not shown) of the tool body (a mounting target). In contrast, when the operation portion 57 is pulled down against the biasing force of the biasing coil spring 53, the hook portion 58, which is exposed to the outside through the hook exposure window 112, is moved down so that the protruding length of a portion of the hook portion 58 exposed to the outside is reduced. Accordingly, the fitting between the hook portion and the female hook portion (not shown) of the tool body (a mounting target) is released, so that it is possible to remove the battery pack 10 from a state where the battery pack 10 has slid and mounted. Meanwhile, reference numeral 59, which is positioned on the front side of the hook exposure window 112 shown in FIG. 1, denotes a vent opening through which air is sent to the internal installation body 21 disposed in the housing case 11.

The electrical connection portions 34 provided on the tool body are electrically connected to body-side connection terminals (reference numerals 91, 92, and 93 in FIG. 7) when the battery pack 10 is slidably mounted on the tool body (not shown). For this reason, the electrical connection portions 34 include three electrical connection portions, that is, positive and negative connection portions 341 and 342 that are electrical connection portions for the charge or discharge of electric power and a control connection portion 343 that is an electrical connection portion to be connected to the above-mentioned control board 26. These three electrical connection portions 34 (the positive connection portion 341, the negative connection portion 342, and the control connection portion 343) generally include terminal-connection openings 35 (a positive connection opening 351, a negative connection opening 352, and a control connection opening 353) shown in FIG. 4 and battery-side connection terminals 36 (positive connection terminals 361, negative connection terminals 362, and control connection terminals 363). Meanwhile, the battery-side connection terminals 36 (the positive connection terminals 361, the negative connection terminals 362, and the control connection terminals 363) are electrically connected to the control board 26 so as to be placed on the control board 26 as shown in FIG. 3. Further, these battery-side connection terminals 36 are formed of elastic leaf spring-shaped metal contacts that are disposed so as to face each other. That is, when the body-side connection terminals (reference numerals 91, 92, and 93 in FIG. 7) of the tool body, which are formed in the shape of a plate, slide to be fitted to these battery-side connection terminals 36, the body-side connection terminals 91, 92, and 93 of the tool body are held between the elastic leaf spring-shaped metal contacts, which are disposed so as to face each other, while coming into contact with the elastic leaf spring-shaped metal contacts. As a result, the body-side connection terminals 91, 92, and 93 are electrically connected to the battery-side connection terminals 36.

Here, the positive connection portion 341 includes the positive connection opening 351 (the terminal-connection opening 35) and the positive connection terminals 361 (the battery-side connection terminals 36). The positive connection opening 351 is formed in the shape of a concave groove extending in the front and rear direction of the battery pack 10 so that the body-side connection terminals (reference numerals 91, 92, and 93 in FIG. 7) of the tool body can be slidably fitted to the positive connection opening 351. The positive connection terminals 361 are provided in the positive connection opening 351 as shown in FIG. 3. The positive connection terminals 361 are to be electrically connected to the body-side connection terminal of the tool body that is slidably fitted, and are formed of leaf spring-shaped metal terminals that are disposed so as to face each other.

The negative connection portion 342 has the same structure as the structure of the positive connection portion 341. That is, the negative connection portion 342 includes the negative connection opening 352 (the terminal-connection opening 35) and the negative connection terminals 362 (the battery-side connection terminals 36). The negative connection opening 352 is formed in the shape of a notch groove extending in the front and rear direction of the battery pack 10 so that the body-side connection terminal of the tool body can be slidably fitted to the negative connection opening 352. The negative connection terminals 362 are provided in the negative connection opening 352 as shown in FIG. 3. The negative connection terminals 362 are electrically connected to the body-side connection terminal of the tool body that is slidably fitted, and are formed of leaf spring-shaped metal terminals that are disposed so as to face each other.

The control connection portion 343 is provided between the above-mentioned positive and negative connection portions 341 and 342. The control connection portion 343 includes the control connection opening 353 (the terminal-connection opening 35) and the control connection terminals 363 (the battery-side connection terminals 36). The control connection opening 353 is formed in the shape of a concave groove extending in the front and rear direction of the battery pack 10 so that the body-side connection terminal of the tool body can be slidably fitted to the control connection opening 353. The control connection terminals 363 are provided in the control connection opening 353 as shown in FIG. 3. The control connection terminals 363 are electrically connected to the control terminal (the body-side connection terminal) of the tool body that is slidably fitted, and are formed of leaf spring-shaped metal terminals that are disposed so as to face each other. Meanwhile, in order to connect the body-side connection terminals (reference numerals 91, 92, and 93 in FIG. 7) of the tool body to these battery-side connection terminals 36 (the positive connection terminals 361, the negative connection terminals 362, and the control connection terminals 363), the body-side connection terminals are connected to the battery-side connection terminals by the slide movement of the battery pack 10 relative to the tool body when the battery pack 10 slides to be mounted on the tool body. Further, the length of the control connection opening 353 is set to be shorter than the lengths of the terminal-connection openings 351 and 352 of the above-mentioned positive and negative connection portions 341 and 342.

Furthermore, since the above-mentioned battery-side connection terminals 36 (the positive connection terminals 361, the negative connection terminals 362, and the control connection terminals 363) are electrically connected to the control board 26, the terminal-connection openings 35 (the positive connection opening 351, the negative connection opening 352, and the control connection opening 353), which have an opening shape and communicate with the inside of the housing case 11 from the outside of the housing case 11, are formed at the portions where these battery-side connection terminals 36 are provided. The terminal-connection openings 35 (the positive connection opening 351, the negative connection opening 352, and the control connection opening 353) are formed at the housing case 11 so that the battery-side connection terminals 36 (the positive connection terminals 361, the negative connection terminals 362, and the control connection terminals 363) are connected to the body-side connection terminals of the tool body. For this reason, these terminal-connection openings 35 (the positive connection opening 351, the negative connection opening 352, and the control connection opening 353) extend in the slide direction corresponding to the slide mounting while making the inside and the outside of the housing case 11 communicate with each other. Meanwhile, the widths of gaps, to which the body-side connection terminals are slidably fitted, of the front portions of the terminal-connection openings 35 (the positive connection opening 351, the negative connection opening 352, and the control connection opening 353) are increased toward the front side so that the body-side connection terminals (reference numerals 91, 92, and 93 in FIG. 7) of the tool body are slidably fitted easily to the terminal-connection openings 35.

Incidentally, as shown in FIG. 2, a rubber cover body 40, which serves to close these terminal-connection openings 35 having an opening shape when the battery pack is not mounted on the tool body, is provided at these terminal-connection openings 35 (the positive connection opening 351, the negative connection opening 352, and the control connection opening 353). That is, as shown in FIG. 1 and FIG. 2, when the battery pack 10 is placed alone without being mounted on a mounting target such as the tool body, the rubber cover body 40 closes the opening shapes of the terminal-connection openings 35 so that the battery-side connection terminals 36 are covered by the rubber cover body 40. Here, the rubber cover body 40 is formed so as to serve not to interfere with the connection between the above-mentioned battery-side connection terminals 36 and the body-side connection terminals (reference numerals 91, 92, and 93 in FIG. 7) of the tool body. The rubber cover body 40 will be described in detail below.

The rubber cover body 40 includes a support 41 and rubber cover main bodies 42. The support 41 is provided so as to be supported on the control board 26. The rubber cover main bodies 42 correspond to foreign-material entry-regulating members according to the invention, and are provided on the respective terminal-connection openings 35 while being supported by the support 41. That is, a positive-terminal rubber cover main body 43 is provided on the positive connection opening 351, a negative-terminal rubber cover main body 44 is provided on the negative connection opening 352, and a control-terminal rubber cover main body 45 is provided on the control connection opening 353.

Figure 5:
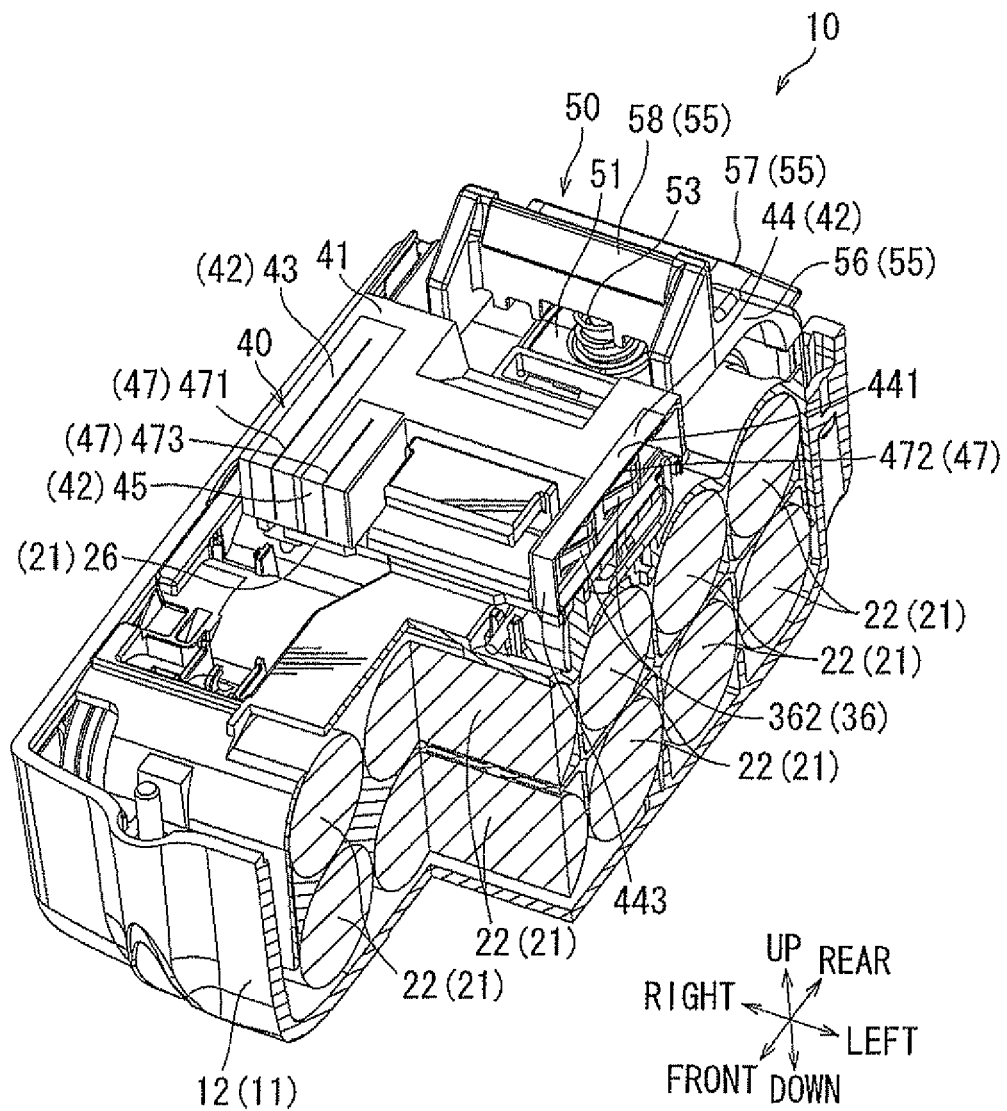
FIG. 5 is a perspective cross-sectional view taken along line V-V of FIG. 4.
Figure 6:
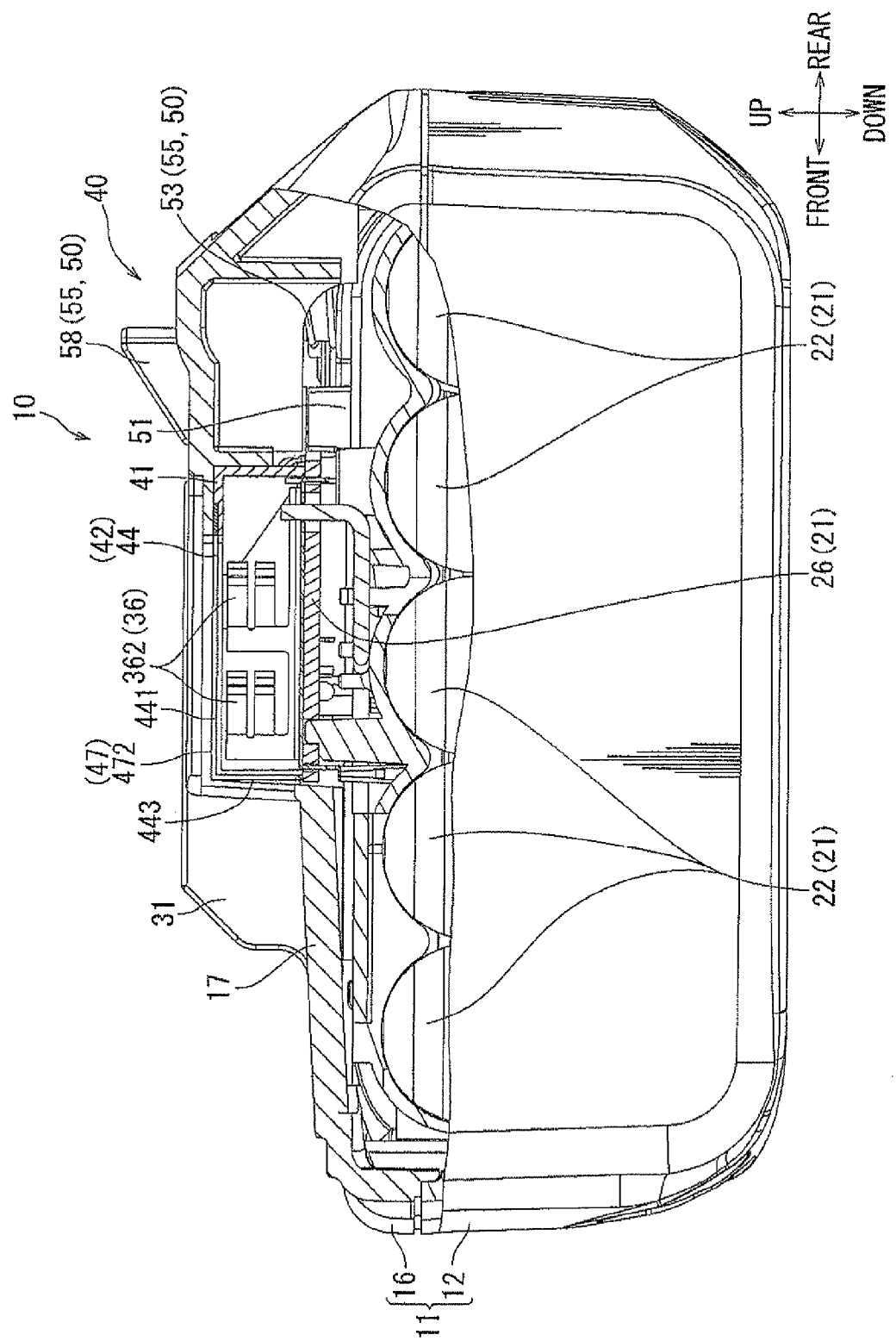
FIG. 6 is a side cross-sectional view showing the battery pack of FIG. 5.

The positive-terminal rubber cover main body 43, the negative-terminal rubber cover main body 44, and the control-terminal rubber cover main body 45 have substantially the same structure. For this reason, the negative-terminal rubber cover main body 44 will be described as an example for the description of the rubber cover main bodies 42. FIG. 4 shows the external top view of the battery pack 10 of FIG. 1. FIG. 5 is a perspective cross-sectional view of the battery pack 10 of FIG. 4 taken along line V-V. FIG. 6 is a side cross-sectional view of the battery pack 10 of FIG. 5. Meanwhile, FIG. 5 and FIG. 6 show the cross-section of the battery pack 10 shown in FIG. 4 from which the upper cover member 16 is removed.

The negative-terminal rubber cover main body 44 (the rubber cover main body 42) is formed by molding a rubber resin that has heat resistance and elasticity. As shown in FIG. 5 and FIG. 6, the negative-terminal rubber cover main body 44 generally includes an upper wall 441 and a front wall 443 that are arranged in an L shape viewed from the side and formed integrally with each other. That is, the upper wall 441 of the negative-terminal rubber cover main body 44 is formed so as to close the upper portion of the above-mentioned negative connection opening 352. In contrast, the front wall 443 of the negative-terminal rubber cover main body 44 is formed so as to close the front portion of the above-mentioned negative connection opening 352.

Here, as shown in FIG. 5 and FIG. 6, a slit 472 (a slit 47) is formed at the upper wall 441 and the front wall 443 of the negative-terminal rubber cover main body 44 that closes the negative connection opening 352 as described above. The slit 472 is formed at the upper and front walls 441 and 443 so as to extend in the front and rear direction of the battery pack 10 corresponding to the slide mounting directions such that the negative-terminal rubber cover main body 44 is split into left and right halves. The slit 472 is formed at the upper and front walls 441 and 443, so that the slit 472 is formed as a cleft into which the body-side connection terminal (reference numeral 92 in FIG. 7) provided on the tool body can be inserted. Meanwhile, although not easily seen in the drawings, the slit 472 is formed continuously on the left and right sides thereof without extending at the rear end portion of the upper wall 441. Further, the slit 472 is formed continuously on the left and right sides thereof without extending at the lower end portion of the front wall 443.

Figure 7:
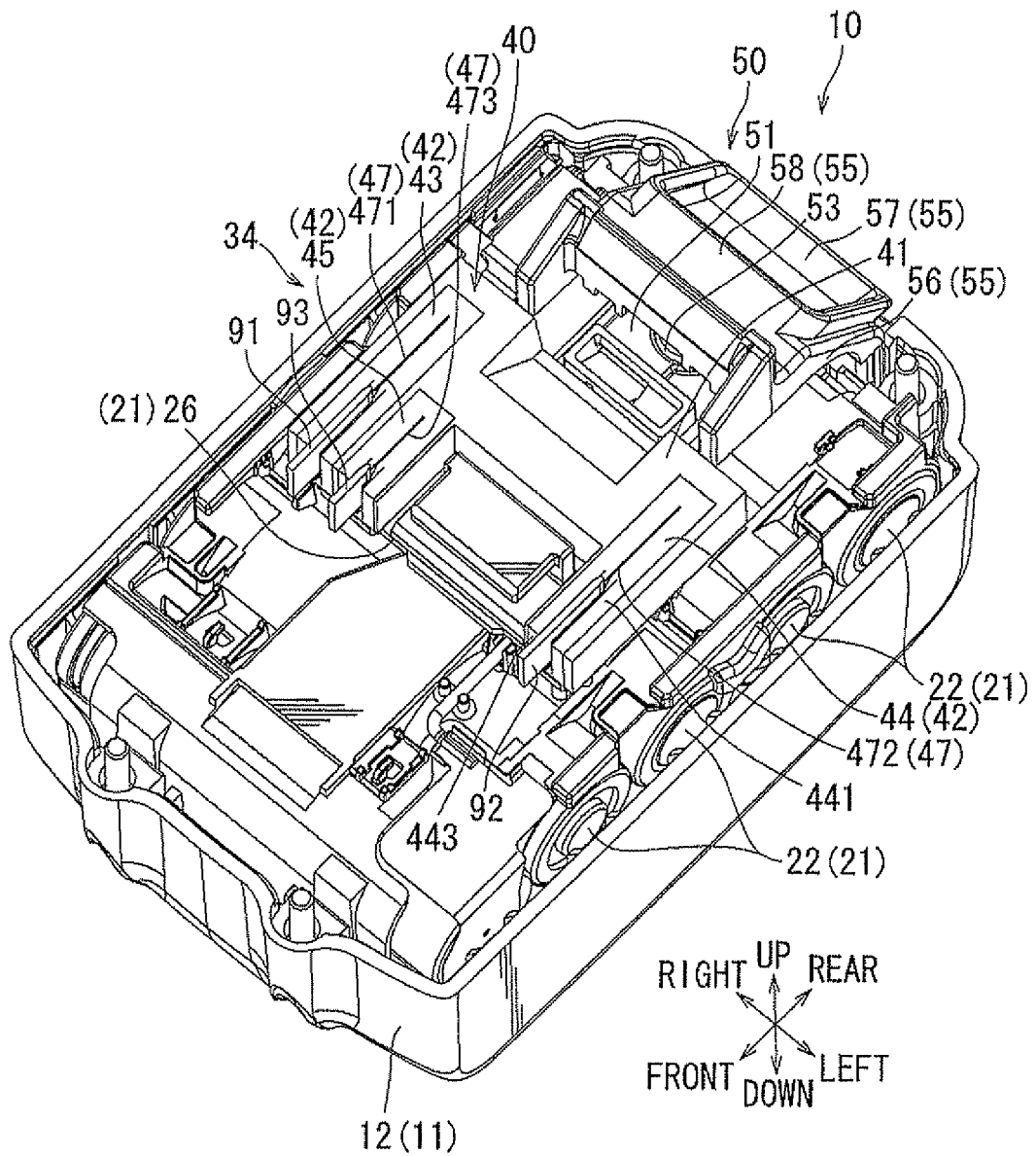
FIG. 7 is an inside perspective view showing the battery pack of FIG. 2 when the battery pack slides to be mounted.

The body-side connection terminal 92, which is provided on the tool body, is inserted into the slit 472 (the slit 47) that is formed at the negative-terminal rubber cover main body 44 (the rubber cover main body 42) in this way. Similar to FIG. 2, FIG. 7 is an inside perspective view showing the inside of the battery pack 10 from which the upper cover member 16 is removed. The body-side connection terminals 91, 92, and 93 of the tool body, which is slidably fitted to the respective terminal-connection openings 35 as the battery pack 10 is slidably mounted on the tool body, are shown in FIG. 7.

That is, as shown in FIG. 7, the body-side connection terminal 92 provided on the tool body is inserted into the slit 472 (the slit 47) of the negative-terminal rubber cover main body 44 (the rubber cover main body 42) that has elasticity and closes the opening shape of the negative connection opening 352 (the terminal-connection opening 35). At this time, the negative-terminal rubber cover main body 44 (the rubber cover main body 42) itself is deformed due to elasticity according to the slide movement of the body-side connection terminal 92 that slidably moves while coming into contact with the negative-terminal rubber cover main body 44. In this case, the body-side connection terminal 92 that slidably moves is inserted into the negative-terminal rubber cover main body 44, and is eventually connected to the negative connection terminals 362 (the battery-side connection terminals 36). In contrast, when the battery pack 10 is placed alone without being mounted on the tool body, the negative-terminal rubber cover main body 44 itself is restored due to elasticity and can close the opening shape of the negative connection opening 352. Meanwhile, the positive-terminal rubber cover main body 43 (the rubber cover main body 42), which has elasticity and closes the opening shape of the positive connection opening 351 (the terminal-connection opening 35), also acts in the same manner as described above, and the control-terminal rubber cover main body 45 (the rubber cover main body 42), which has elasticity and closes the opening shape of the control connection opening 353 (the terminal-connection opening 35), also acts in the same manner as described above.

Incidentally, as shown in FIG. 6, the vicinity of a portion where the positive connection terminals 361 (the positive connection portion 341) are disposed, the vicinity of a portion where the negative connection terminals 362 (the negative connection portion 342) are disposed, and a portion in front of a portion where the control connection terminals 363 (the control connection portion 343) are disposed are configured to be the upper surface 17 of the battery pack 10 and also the upper surface of the housing case 11. The upper surface 17 of the battery pack 10 is formed to have an inclined structure (the shape of an inclined flat surface). That is, the upper surface 17 of the battery pack 10 has the shape of a substantially flat surface, and has an angle of inclination so as to be inclined downward with respect to the battery pack 10 toward the front side of the battery pack 10. For this reason, when water is put on the upper surface 17 of the battery pack 10 such as when water is splashed on the upper surface 17 of the battery pack 10, the water on the upper surface 17 of the battery pack 10 does not flow toward the portions where the electrical connection portions 34 (the positive connection portion 341, the negative connection portion 342, and the control connection portion 343) are disposed on the upper surface 17 of the battery pack 10 and flows toward the front side of the battery pack 10 that is opposite to the portions where the electrical connection portions 34 are disposed. In other words, water on the upper surface 17 of the battery pack 10 flows in the direction where water becomes distant from the portions where the electrical connection portions 34 are disposed. Meanwhile, as shown in FIG. 6, the upper surface 17 of the battery pack 10 is formed in a step shape, which protrudes upward to be higher, at the front opening ends of the terminal-connection openings 35 (the positive connection opening 351, the negative connection opening 352, and the control connection opening 353) of the electrical connection portions 34 that face the upper surface 17 of the battery pack 10. Due to the step shape that protrudes to be higher, it is difficult for water, which is on the upper surface 17 of the above-mentioned battery pack 10, to flow toward the terminal-connection openings 35 (the positive connection opening 351, the negative connection opening 352, and the control connection opening 353).

According to the battery pack 10 of the above-mentioned first embodiment, it is possible to obtain the following functional effects.

That is, according to the above-mentioned battery pack 10, the rubber cover main bodies 42 (the positive-terminal rubber cover main body 43, the negative-terminal rubber cover main body 44, and the control-terminal rubber cover main body 45) as the foreign-material entry-regulating members close the opening shapes of the terminal-connection openings 35 (the positive connection opening 351, the negative connection opening 352, and the control connection opening 353) when the battery pack 10 is placed alone without being mounted on the tool body (not shown). Accordingly, when the battery pack 10 is removed from the tool body and is placed alone, it is possible to regulate the entry of foreign materials, such as water or dust, from the terminal-connection openings 35 by the rubber cover main bodies 42. Therefore, it is possible to protect the battery-side connection terminals 36 (the positive connection terminals 361, the negative connection terminals 362, and the control connection terminals 363) in the terminal-connection openings 35 so that the battery-side connection terminals 36 are not damaged. Further, since the rubber cover main bodies 42 serve not to interfere with connection when the body-side connection terminals are connected to the battery-side connection terminals 36, the rubber cover main bodies 42 do not hinder the electrical connection between the body-side connection terminals 91, 92, and 93 and the battery-side connection terminals 36. Therefore, according to the above-mentioned battery pack 10, the electrical connection between the body-side connection terminals 91, 92, and 93 and the battery-side connection terminals that is caused by slide mounting is not hindered, and it is possible to protect the battery-side connection terminals 36 in the terminal-connection openings 35 so that the battery-side connection terminals 36 are not damaged even though the battery pack 10 is removed from the tool body and is placed alone.

Furthermore, the rubber cover main bodies 42 of the above-mentioned battery pack 10 have elasticity and are formed in a shape that closes the opening shapes. Accordingly, when the body-side connection terminals 91, 92, and 93 are connected to the battery-side connection terminals 36, the rubber cover main bodies 42 themselves are deformed due to elasticity according to the slide movement of the body-side connection terminals 91, 92, and 93 and the body-side connection terminals 91, 92, and 93 can be inserted into the rubber cover main bodies 42. Moreover, when the battery pack 10 is placed alone without being mounted on the tool body, the rubber cover main bodies 42 themselves are restored due to elasticity and can close the opening shapes of the terminal-connection openings 35. Therefore, according to the above-mentioned battery pack 10, since it is possible to make the battery pack simple, it is possible to reduce the manufacturing cost of the battery pack and to also simplify the assembly work.

Further, according to the above-mentioned battery pack 10, the rubber cover main bodies 42 are formed to have heat resistance. Accordingly, even though the battery pack 10 is heated when being used or charged, it is possible to reduce the deterioration of the rubber cover main bodies 42 that is caused by this heat. Therefore, it is also possible to contribute to the extension of the lifetime of a product as the battery pack 10 by reducing the deterioration of the rubber cover main bodies 42.

Second Embodiment

Figure 8:
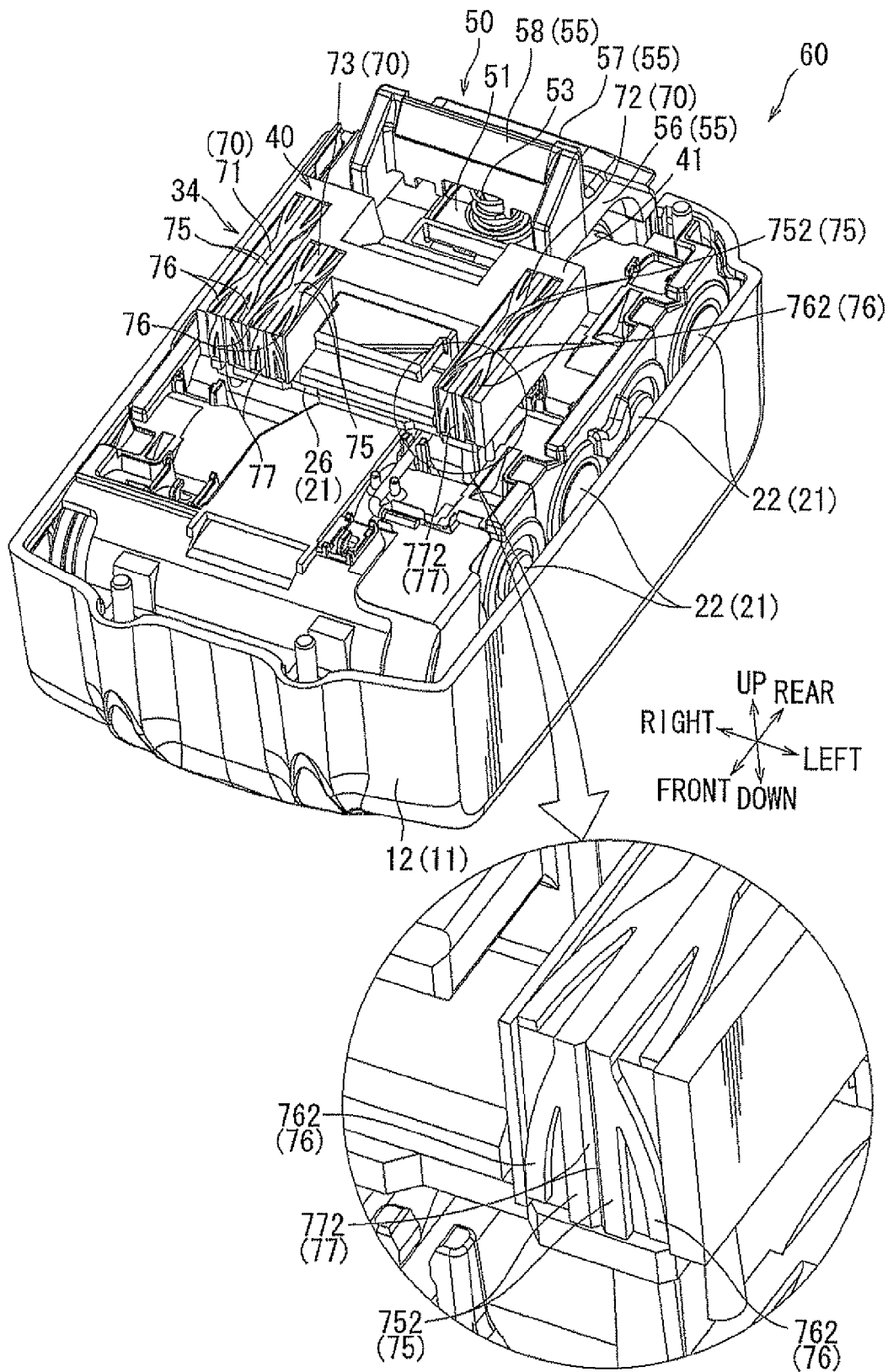
FIG. 8 is an inside perspective view showing the inside of a battery pack of a second embodiment.
Figure 9:
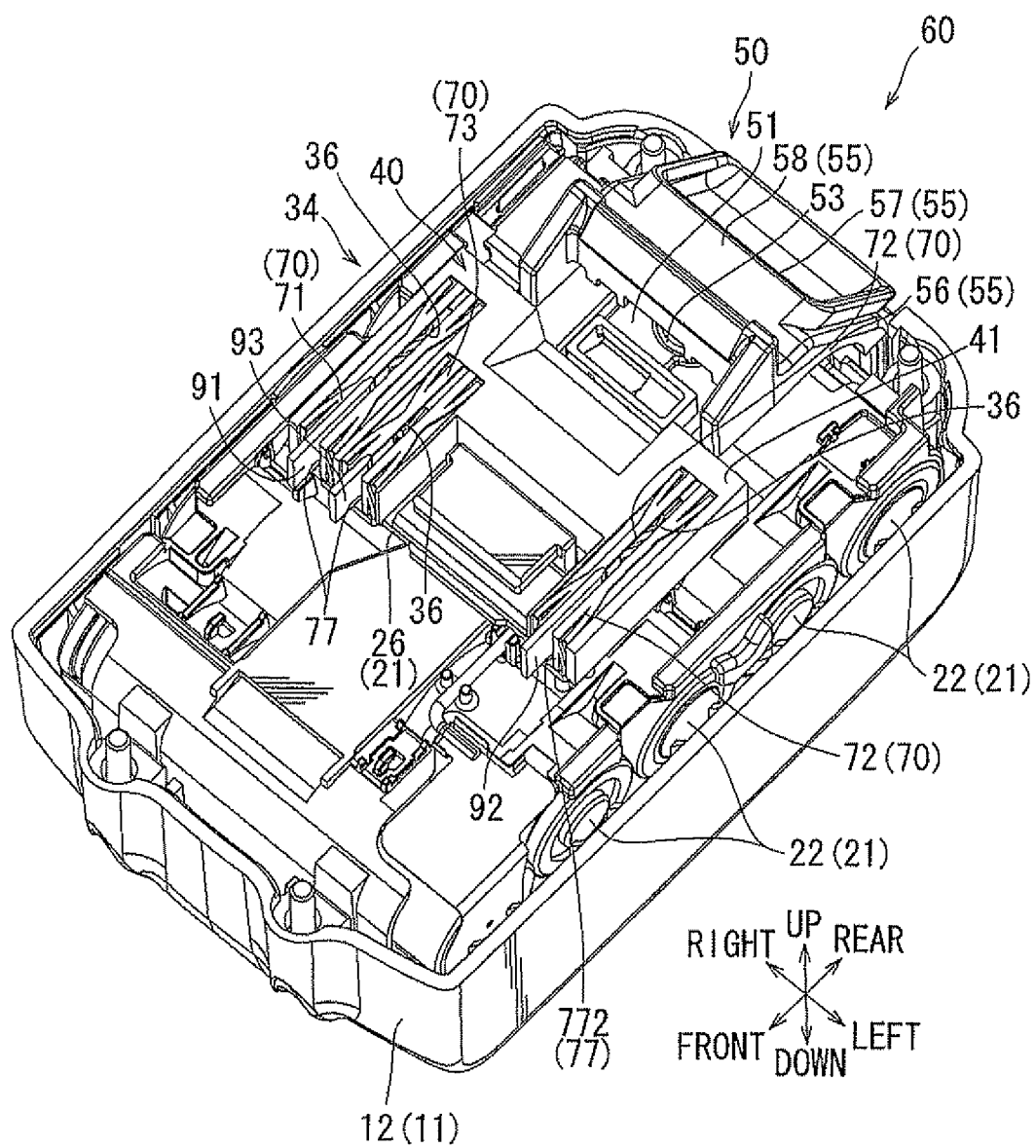
FIG. 9 is an inside perspective view showing the battery pack of FIG. 8 when the battery pack slides to be mounted.
Figure 10:
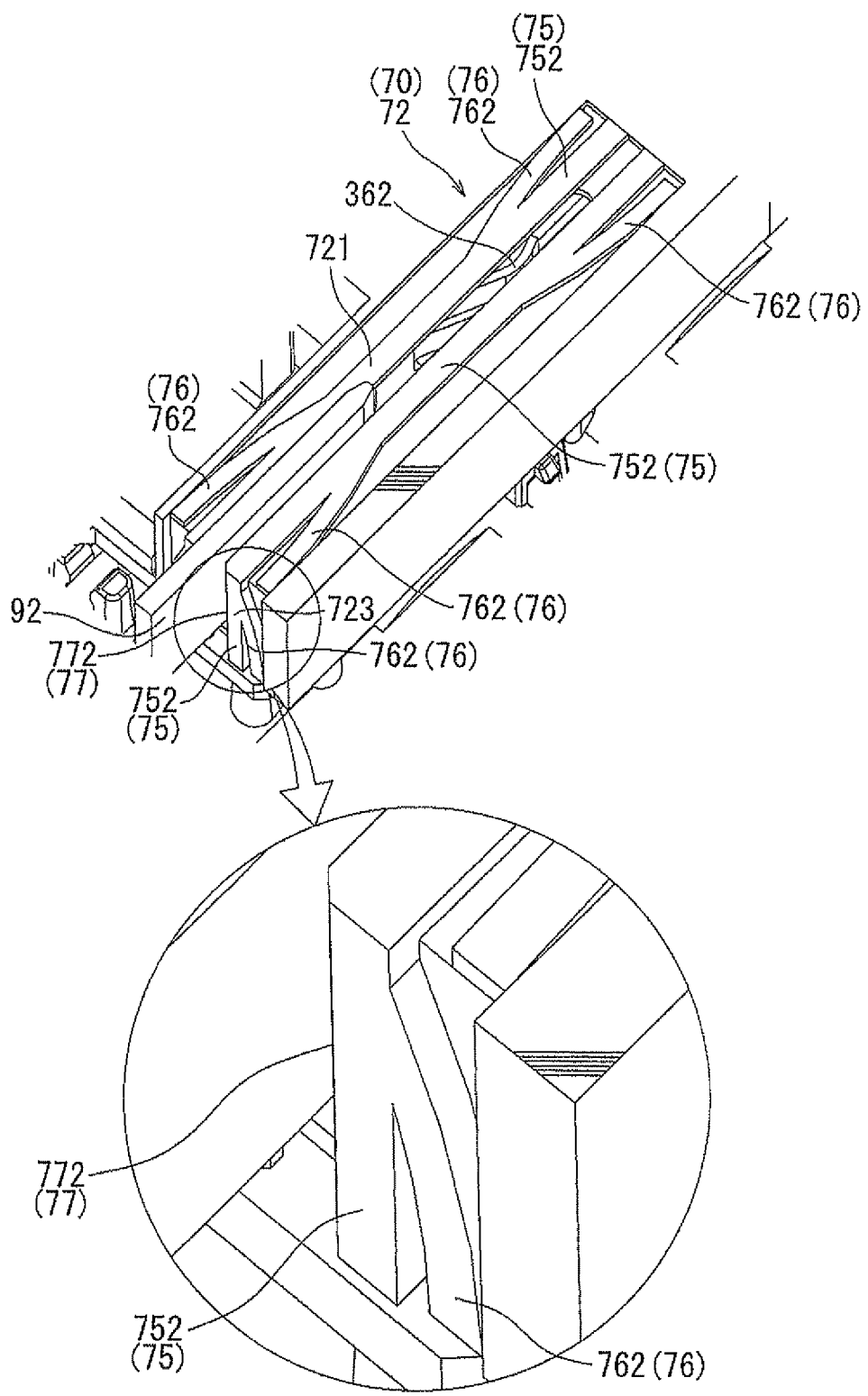
FIG. 10 is an enlarged perspective view showing an enlarged electrical connection portion of FIG. 9.

Next, a second embodiment, which embodies the battery pack according to the invention, will be described with reference to FIG. 8 to FIG. 10. FIG. 8 is an inside perspective view showing the inside of a battery pack 60 of a second embodiment. FIG. 9 is an inside perspective view of the battery pack of FIG. 8 when the battery pack is slidably mounted. FIG. 10 is an exploded perspective view of a negative connection portion 342 (an electrical connection portions 34) of FIG. 9.

The battery pack 60 of the second embodiment is obtained by substituting elastic opening-closing members 70 for the rubber cover main bodies 42, which correspond to the foreign-material entry-regulating members according to the invention, of the battery pack 10 of the above-mentioned first embodiment. For this reason, the other structure of the battery pack 60 of the second embodiment to be described below except for the elastic opening-closing members 70 is the same as the structure of the battery pack 10 of the above-mentioned first embodiment. Accordingly, the same portions of the battery pack 60 as those of the above-mentioned battery pack 10 are denoted by the above-mentioned reference numerals, and the description thereof will be omitted.

As shown in FIG. 8, the elastic opening-closing members 70, which are substituted for the above-mentioned rubber cover main bodies 42, correspond to the foreign-material entry-regulating members according to the invention, and serve to close terminal-connection openings 35 having an opening shape when the battery pack is not mounted on the tool body. Further, the elastic opening-closing members 70 are formed to serve not to interfere with the connection between the battery-side connection terminals 36 and the body-side connection terminal (reference numerals 91, 92, and 93 in FIG. 9) of the tool body.

The elastic opening-closing members 70 will be described in detail below.

As shown in FIG. 8, the elastic opening-closing members 70 are provided on the respective terminal-connection openings 35 like the above-mentioned rubber cover main bodies 42. That is, a positive-terminal elastic opening-closing member 71 is provided on a positive connection opening 351, a negative-terminal elastic opening-closing member 72 is provided on a negative connection opening 352, and a control-terminal elastic opening-closing member 73 is provided on a control connection opening 353. Meanwhile, the positive-terminal elastic opening-closing member 71, the negative-terminal elastic opening-closing member 72, and the control-terminal elastic opening-closing member 73 have substantially the same structure. For this reason, the negative-terminal elastic opening-closing member 72 will be described as an example for the description of the elastic opening-closing members 70.

The negative-terminal elastic opening-closing member 72 (the elastic opening-closing member 70) is formed by molding a plastic resin that has heat resistance and elasticity. As shown in FIG. 10, the negative-terminal elastic opening-closing member 72 generally includes an upper wall 721 and a front wall 723 that are arranged in an L shape viewed from the side and formed integrally with each other. That is, the upper wall 721 of the negative-terminal elastic opening-closing member 72 is formed so as to close the upper portion of the above-mentioned negative connection opening 352 (the terminal-connection opening 35). In contrast, the front wall 723 of the negative-terminal elastic opening-closing member 72 is formed so as to close the front portion of the above-mentioned negative connection opening 352.

The upper and front walls 721 and 723 of the negative-terminal elastic opening-closing member 72 have a divided structure so as to be split into paired left and right halves. That is, the negative-terminal rubber cover main body 44 of the above-mentioned first embodiment is formed so as to be split into halves at the position of the slit 472. Meanwhile, as in the above-mentioned first embodiment, this split direction extends in the front and rear direction of the battery pack 10 corresponding to the slide mounting direction, and the slit is formed as a cleft into which a body-side connection terminal (reference numeral 92 in FIG. 10) provided on the tool body can be inserted.

The negative-terminal elastic opening-closing member 72, which is formed so as to be a pair as described above, is a product including that the upper and front walls that are arranged in an L shape viewed from the side and formed integrally with each other. However, from a functional point of view, the negative-terminal elastic opening-closing member 72 includes door portions 752 (reference numeral 75 with regard to the elastic opening-closing members 70) and biasing portions 762 (reference numeral 76 with regard to the elastic opening-closing members 70) that bias the door portions 752.

As shown in FIG. 8 and FIG. 9, the door portions 752 are formed of portions of the negative-terminal elastic opening-closing member 72 that make a pair and face each other. The door portions 752 are portions that serve to open and close the opening shape of the above-mentioned negative connection opening 352 (the terminal-connection opening 35) like doors. When closing the opening shape of the negative connection opening 352, the door portions 752 block the opening shape of the negative connection opening 352. Conversely, when the door portions 752 open the opening shape of the negative connection opening 352, the body-side connection terminal (reference numeral 92 in FIG. 10) provided on the above-mentioned tool body can be inserted and can be connected to the negative connection terminals 362 (the battery-side connection terminals 36). For this purpose, the door portions 752 are formed to correspond to the opening shape of the negative connection opening 352. Specifically, the door portions 752 are formed in the shape extending in the front and rear direction of the slide mounting of the battery pack 60 so as to have the shape corresponding to the opening shape of the negative connection opening 352 (the terminal-connection opening 35). The door portions 752, which are formed as described above, are portions that can approach each other and be separated from each other and serve to be capable of closing the negative connection opening 352 (the terminal-connection opening 35) when the door portions 752 approach each other until coming into contact with each other. Meanwhile, the biasing portions 762 are portions that serve to bias the door portions 752 in a closing direction so that the opening shape of the negative connection opening 352 (the terminal-connection opening 35) is closed by the door portions 752. For this purpose, the biasing portion 762 is formed in an inverted V shape as enlargedly shown in FIG. 10 so that an appropriate gap is formed between the biasing portion 762 and the above-mentioned door portion 752. For this reason, the biasing portion 762 is formed so that the inner portion of the biasing portion 762 is connected to the above-mentioned door portion 752 and the outer portion of the biasing portion 762 comes into contact with the opening end edge of the negative connection opening 352 (the terminal-connection opening 35). Accordingly, the biasing portion 762 biases the door portion 752 in the closing direction by the elasticity thereof. Meanwhile, the biasing portions 762 are elastically deformed from the state of FIG. 8 to the state of FIG. 9 when the body-side connection terminal 92 is connected to the negative connection terminals 362 (the battery-side connection terminals 36).

That is, when the body-side connection terminal 92 comes into contact with the door portions 752 of the negative-terminal elastic opening-closing member 72 (the elastic opening-closing member 70) and slidably moves from the state shown in FIG. 8 to the state shown in FIG. 9, the door portions 752 are opened against the biasing forces of the above-mentioned biasing portions 762 according to the slide movement of the body-side connection terminal 92. Accordingly, the body-side connection terminal 92 can be inserted into the negative-terminal elastic opening-closing member 72 and can be connected to the negative connection terminals 362 (the battery-side connection terminals 36) provided on the inside thereof. Further, in an opposite manner, when the battery pack 60 is placed alone without being mounted on the tool body, the door portions 752 are closed by the biasing forces of the biasing portions 762 of the negative-terminal elastic opening-closing member 72 and the opening shape of the negative connection opening 352 (the terminal-connection opening 35) can be closed.

Meanwhile, as shown in enlarged views of portions that are extracted with circles shown in FIG. 8 and FIG. 10, chamfers 772 (reference numeral 77 with regard to the elastic opening-closing members 70), which correspond to guide portions according to the invention, are formed on the front walls 723 of the negative connection terminals 362 (the battery-side connection terminals 36). The chamfers 772 are formed at the portions, which face each other, of the front walls 723 of the paired door portions 752. Specifically, the chamfers 772 are formed so that the front end edge portions facing each other are chamfered into corner portions having an acute angle. The chamfers 772 are formed at the door portions 752 with which the body-side connection terminal 92 comes into contact by the slide movement of the body-side connection terminal 92 when the above-mentioned tool body is slidably moved. Accordingly, since it is possible to smoothly move the body-side connection terminal 92 along the chamfer shapes of the chamfers 772, it is possible to smoothly open the door portions 752 according to the slide movement of the body-side connection terminal 92. That is, the chamfers 772 can guide the slide movement of the body-side connection terminal 92.

According to the battery pack 60 of the above-mentioned second embodiment, it is possible to obtain the following functional effects.

That is, the elastic opening-closing member 70 (foreign-material entry-regulating member) of the above-mentioned battery pack 60 includes the door portions 75 that block the opening shape so as to be capable of being opened and closed, and the biasing portions 76 that close the opening shape with the door portions 75 by biasing the door portions 75 in the closing direction. Accordingly, when the body-side connection terminals 91, 92, and 93 are connected to the battery-side connection terminals 36 as shown in FIG. 9, it is possible to open the door portions 75 by elastically deforming the biasing portions 76 according to the slide movement of the body-side connection terminals 91, 92, and 93 and to insert the body-side connection terminals 91, 92, and 93 into the elastic opening-closing members 70. Further, when the battery pack 60 is placed alone without being mounted on the tool body, it is possible to close the opening shapes of the terminal-connection openings 35 by closing the door portions 75 with the biasing forces of the biasing portions 76 of the elastic opening-closing members 70. Accordingly, since the functions of the elastic opening-closing member 70 as the foreign-material entry-regulating member are separately obtained, it is possible to more reliably obtain functional effects as compared to the above-mentioned first embodiment.

Furthermore, according to the above-mentioned battery pack 60, since the chamfers 77 as the guide portions are formed at the portions of the elastic opening-closing members 70 with which the body-side connection terminals 91, 92, and 93 come into contact, the body-side connection terminals 91, 92, and 93 can be guided so as to be capable of being inserted into the elastic opening-closing members 70. Accordingly, it is possible to smoothly insert the body-side connection terminals 91, 92, and 93 into the elastic opening-closing members 70 by the slide movement of the body-side connection terminals 91, 92, and 93 when the tool body is slidably mounted.

Moreover, according to the above-mentioned battery pack 60, the elastic opening-closing member 70 is a molded product that is made of a plastic resin having heat resistance. Accordingly, even though the battery pack 60 is heated when being used or charged, it is possible to reduce the deterioration of the elastic opening-closing members 70 that is caused by this heat. Therefore, it is also possible to contribute to the extension of the lifetime of a product as the battery pack 10 by reducing the deterioration of the elastic opening-closing members 70.

Meanwhile, the battery pack according to the invention is not limited to the above-mentioned embodiments and the appropriate portions thereof may be changed as described below.

The rubber cover bodies 40 and the elastic opening-closing members 70 of the battery packs 10 and 60 of the above-mentioned embodiment have been formed of members formed separately from the housing case 11 that is the above-mentioned exterior case. However, the foreign-material entry-regulating members according to the invention are not limited thereto, and may be integrated with the housing case. When the foreign-material entry-regulating members are integrated with the housing case as described above, it is possible to reduce the man-hours for assembling parts, which is advantageous in a manufacturing operation. In an opposite manner, when the foreign-material entry-regulating members are formed separately from the housing case, it is possible to simplify the molding of parts, which is advantageous in the manufacture of parts.

In the battery pack 10 of the above-mentioned first embodiment, the rubber cover main bodies 42 are described as the foreign-material entry-regulating members according to the invention. However, a member, which is formed in the shape of a brush by arranging a plurality of elastic capillaceous piles in parallel, may be used as the foreign-material entry-regulating member that is exemplified by the rubber cover main body 42. That is, the foreign-material entry-regulating members of the battery pack according to the above-mentioned second invention only have to serve to be deformed due to the elasticity thereof so that the body-side connection terminals 91, 92, and 93 can be inserted thereinto, and only have to serve to be restored due to the elasticity thereof so as to close to the opening shapes of the terminal-connection openings 35 when the battery pack 10 is placed alone without being mounted on the tool body. Further, brush-shaped members, which are formed by arranging the above-mentioned plurality of elastic capillaceous piles in parallel, are also applicable to the foreign-material entry-regulating members. Meanwhile, the piles (a short and thin line resin having elasticity) of the brush-shaped member may be processed so that the above-mentioned heat resistance is improved, or may be processed to have water repellency so that an effect of regulating the entry of water is improved.

Furthermore, the door portions 75 and the biasing portions 76 of the above-mentioned elastic opening-closing member 70 are formed by integrally molding a plastic resin. However, the door portions and the biasing portion according to the invention may be portions that are formed as parts formed separately from each other, and are also not limited to molded products made of a plastic resin. For example, the door portions and the biasing portions may be formed of separate metal parts. Meanwhile, when the door portions 75 and the biasing portions 76 are formed of an integrally molded product as described above, there is an advantage of simplifying the assembly work.

Moreover, the chamfers 77 are formed on the above-mentioned elastic opening-closing members 70 as the guide portions according to the invention. However, the guide portions according to the invention may have, for example, a function of guiding the body-side connection terminals 91, 92, and 93 so that the body-side connection terminals 91, 92, and 93 can be inserted into the elastic opening-closing members 70, and thus various shapes, such as a tapered shape and an inclined shape, can be selected as the shape of the guide portion. Further, the guide portions, which serve as the chamfers 77, may be formed on the above-mentioned rubber cover main bodies 42.

EXPLANATION OF SYMBOLS 10, 60 . . . battery pack
11 . . . housing case
12 . . . case main body
21 . . . internal installation body
26 . . . control board
30 . . . slide mounting portion
31 . . . slide guide portion
34 . . . electrical connection portion
35 . . . terminal-connection opening
36 . . . battery-side connection terminal
40 . . . rubber cover body 42 . . . rubber cover main body (foreign-material entry-regulating member)
43 . . . positive-terminal rubber cover main body (foreign-material entry-regulating member)
44 . . . negative-terminal rubber cover main body (foreign-material entry-regulating member)
45 . . . control-terminal rubber cover main body (foreign-material entry-regulating member)
47 (471, 472, 473) . . . slit
50 . . . male hook mechanism
55 . . . male hook body
58 . . . hook portion
59 . . . vent opening
70 . . . elastic opening-closing member (foreign-material entry-regulating member)
71 . . . positive-terminal elastic opening-closing member (foreign-material entry-regulating member)
72 . . . negative-terminal elastic opening-closing member (foreign-material entry-regulating member)
73 . . . control-terminal elastic opening-closing member (foreign-material entry-regulating member)
75 (752) . . . door portion
76 (762) . . . biasing portion
77 (772) . . . chamfer (guide portion)
91, 92, 93 . . . body-side connection terminal

What is claimed is:

1. A battery pack that is configured to be capable of slidably moving on a tool body of an electric power tool served as a power source of the electric power tool and that includes battery-side connection terminals to which body-side connection terminals of the tool body are connected by a relative slide movement when the battery pack slides to be mounted, wherein:

a housing case that forms an exterior of the battery pack is provided with terminal-connection openings that extend in a slide direction of slide mounting with the inside and outside of the housing case communicating with each other, such that the body-side connection terminals can be connected to the battery-side connection terminals, the terminal-connection openings are provided with foreign-material entry-regulating members having elasticity by themselves that can close openings of the terminal-connection openings when the battery pack is placed alone without being mounted on the tool body, the foreign-material entry-regulating members serve not to interfere with the connection when the body-side connection terminals are connected to the battery-side connection terminals, the foreign-material entry-regulating members include door portions door portions that can open and close the openings of the terminal-connection openings and also include biasing portions that can close the openings of the terminal-connection openings with the door portions by biasing the door portions in a closing direction, when the body-side connection terminals are connected to battery-side connection terminals, the door portions are opened against biasing forces of the biasing portions according to the slide movement of the body-side connection terminals that come into contact with the door portions of the foreign-material entry-regulating members and slidably move such that the body-side connection terminals can be inserted into the foreign-material entry-regulating members, when the battery pack is placed alone without being mounted on the tool body, the door portions are closed by the biasing forces of the biasing portions of the foreign-material entry-regulating members so as to close the openings of the terminal-connection openings, and the door portions are integrally formed with the biasing portions as a one piece unitary structure.

2. The battery pack according to claim 1, wherein:

the foreign-material entry-regulating members and are formed in a shape that can close the openings of the terminal-connection openings, when the body-side connection terminals are connected to the battery-side connection terminals, the foreign-material entry-regulating members themselves are deformed due to elasticity according to the slide movement of the body-side connection terminals that come into contact with the foreign-material entry-regulating members and slidably move such that the body-side connection terminals can be inserted into the foreign-material entry-regulating members, and when the battery pack is placed alone without being mounted on the tool body, the foreign-material entry-regulating members themselves are restored due to elasticity so as to close the openings of the terminal-connection openings.

3. The battery pack according to claim 1, wherein guide portions are provided at portions of the foreign-material entry-regulating members with which the body-side connection terminals come into contact by the slide movement of the body-side connection terminals when the tool body slides to be mounted, the guide portions configured to guide the body-side connection terminals such that the body-side connection terminals can be inserted into the foreign-material entry-regulating members.

4. The battery pack according to claim 1, wherein the foreign-material entry-regulating members are formed to have heat resistance such that the foreign-material entry-regulating members are capable of resisting heat generated by batteries within the battery pack and the battery pack functions properly.

5. The battery pack according to claim 3, wherein the foreign-material entry-regulating members are formed to have heat resistance such that the foreign-material entry-regulating members are capable of resisting heat generated by batteries within the battery pack and the battery pack functions properly.

6. The battery pack according to claim 1, wherein the foreign-material entry-regulating members are made of rubber resin to prevent entry of water and/or dust.

* * * * *